(12) United States Patent
Seo

(10) Patent No.: US 11,270,679 B2
(45) Date of Patent: Mar. 8, 2022

(54) WATERPROOF SOUND-TRANSMITTING SHEET

(71) Applicant: AMOGREENTECH CO., LTD., Gimpo-si (KR)

(72) Inventor: In-Yong Seo, Seoul (KR)

(73) Assignee: AMOGREENTECH CO., LTD., Gyeonggi-Do (KR)

( * ) Notice: Subject to any disclaimer, the term of this patent is extended or adjusted under 35 U.S.C. 154(b) by 11 days.

(21) Appl. No.: 16/314,893

(22) PCT Filed: Jun. 30, 2017

(86) PCT No.: PCT/KR2017/006990
§ 371 (c)(1),
(2) Date: Jan. 3, 2019

(87) PCT Pub. No.: WO2018/008909
PCT Pub. Date: Jan. 11, 2018

(65) Prior Publication Data
US 2019/0259363 A1    Aug. 22, 2019

(30) Foreign Application Priority Data
Jul. 7, 2016  (KR) .................. 10-2016-0086225

(51) Int. Cl.
*G10K 11/00* (2006.01)
*H04M 1/03* (2006.01)
(Continued)

(52) U.S. Cl.
CPC .............. *G10K 11/002* (2013.01); *B32B 7/02* (2013.01); *B32B 7/12* (2013.01); *B32B 7/14* (2013.01);
(Continued)

(58) Field of Classification Search
CPC ........ G10K 11/002; G10K 11/24; B32B 7/12; B32B 7/14; H04M 1/03; H04M 1/035;
(Continued)

(56) References Cited

U.S. PATENT DOCUMENTS

2010/0247857 A1\* 9/2010 Sanami ................... H04M 1/18
428/138
2012/0188690 A1\* 7/2012 Aihara ................. H04N 5/2252
361/679.01
(Continued)

FOREIGN PATENT DOCUMENTS

CN    104053078 A    9/2014
CN    104136211 A    11/2014
(Continued)

OTHER PUBLICATIONS

Nitto Product Data Sheet No. 532 (www.nitto.com) (Year: 2018).\*
(Continued)

*Primary Examiner* — Alicia J Sawdon
(74) *Attorney, Agent, or Firm* — CL Intellectual LLC

(57) ABSTRACT

A waterproof sound-transmitting sheet, which forms a reinforcement member on a waterproof sound-transmitting layer, thus maintaining waterproof performance and sound-transmitting performance by minimizing the displacement amount while maintaining stretch-shrinkage performance at a water pressure of about 1 atm or more. The waterproof sound-transmitting sheet may be configured to include a waterproof sound-transmitting layer formed in a film shape having elasticity, a first adhesive layer adhered to one surface of the waterproof sound-transmitting layer, a second adhesive layer adhered to the other surface of the waterproof sound-transmitting layer, and a reinforcement member formed of a hardening material to be formed on the waterproof sound-transmitting layer, thus maintaining waterproof and sound-transmitting performance by minimizing the dis- (Continued)

placement amount while maintaining stretch-shrinkage performance of the waterproof sound-transmitting layer even when a pressure of about 1 atm or more is applied thereto.

11 Claims, 4 Drawing Sheets

(51) Int. Cl.
*H04R 1/44* (2006.01)
*B32B 7/02* (2019.01)
*B32B 7/14* (2006.01)
*H04R 1/02* (2006.01)
*H04M 1/18* (2006.01)
*H04R 1/08* (2006.01)
*B32B 7/12* (2006.01)

(52) U.S. Cl.
CPC .............. *H04M 1/03* (2013.01); *H04M 1/035* (2013.01); *H04M 1/18* (2013.01); *H04R 1/02* (2013.01); *H04R 1/08* (2013.01); *H04R 1/44* (2013.01); *B32B 2307/7265* (2013.01)

(58) Field of Classification Search
CPC ........... H04M 1/18; H04R 1/02; H04R 1/023; H04R 1/08; H04R 1/086; H04R 1/44; H04R 2499/11
See application file for complete search history.

(56) References Cited

U.S. PATENT DOCUMENTS

| 2014/0254849 | A1 | 9/2014 | Abe et al. |
| 2015/0001000 | A1* | 1/2015 | Seo ............................ B32B 7/02 |
| | | | 181/211 |
| 2015/0259900 | A1 | 9/2015 | Humphreys et al. |
| 2016/0212526 | A1* | 7/2016 | Salvatti .................. H04R 1/026 |

FOREIGN PATENT DOCUMENTS

| CN | 104798380 A | 7/2015 |
| JP | 2014-123937 A | 7/2014 |
| KR | 2010-0041839 A | 4/2010 |
| KR | 2010-0082006 A | 7/2010 |
| KR | 10-1213140 B1 | 12/2012 |
| KR | 10-1436100 B1 | 9/2014 |
| KR | 10-1460303 B1 | 11/2014 |

OTHER PUBLICATIONS

Office Action issued in Chinese Patent Application No. 201780041526.6, dated Sep. 3, 2019.
Chinese Office Action—2020042902237810.

* cited by examiner

[FIG. 1]
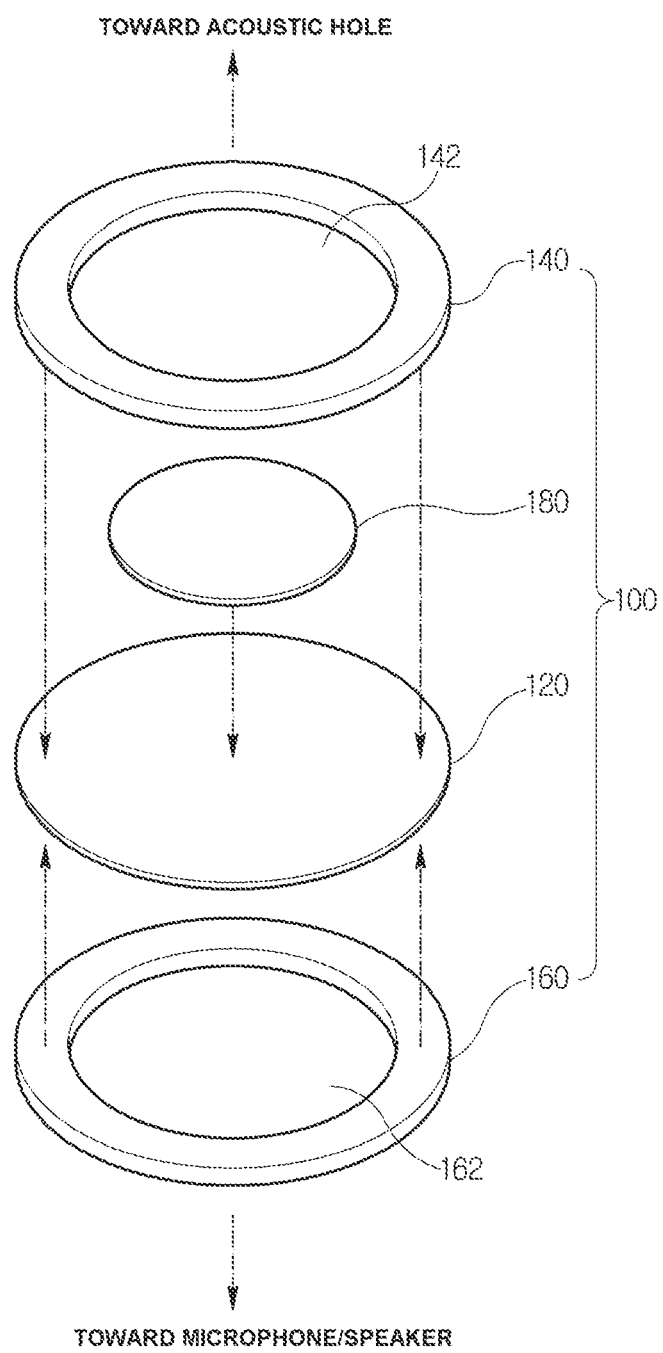

[FIG. 2]
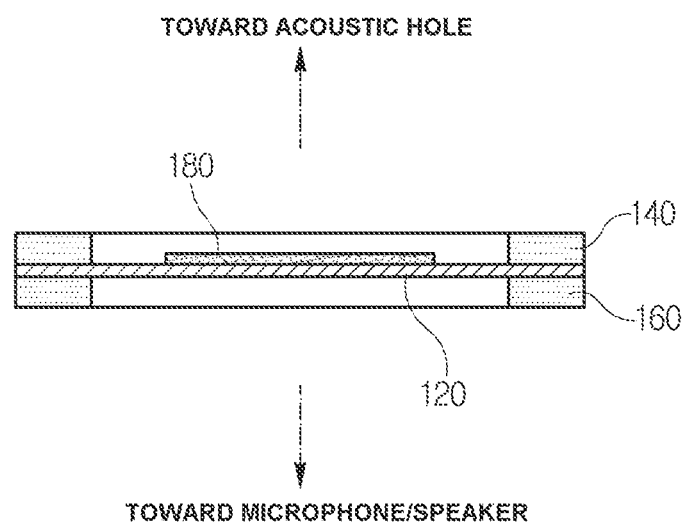
[FIG. 3]
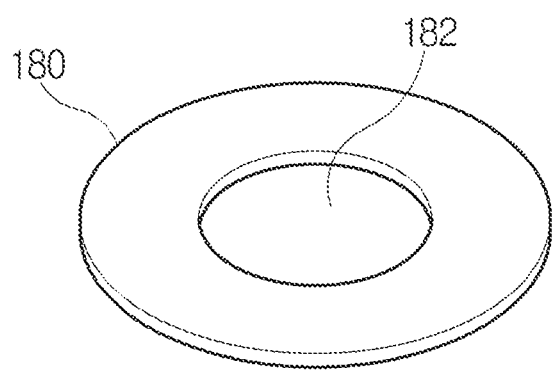

[FIG. 4]
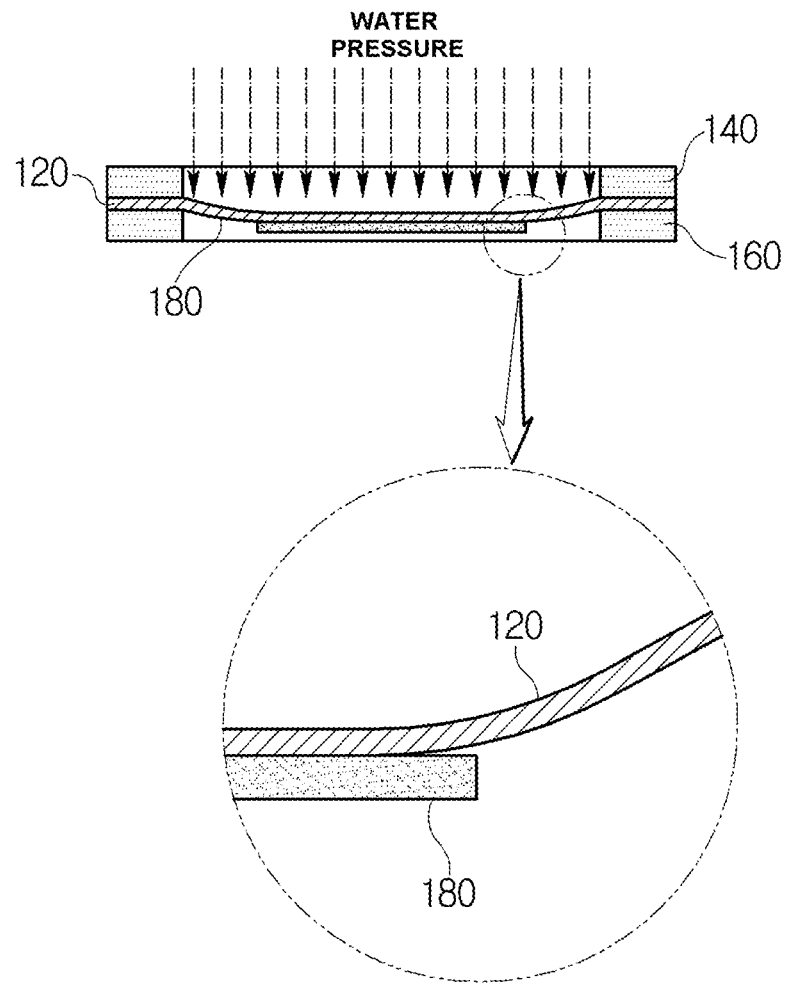
[FIG. 5]
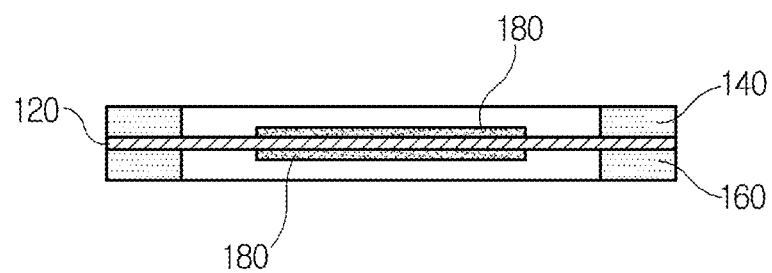

[FIG. 6]
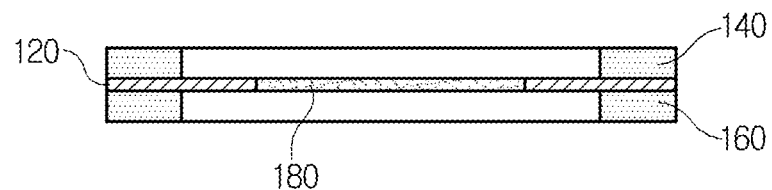
[FIG. 7]
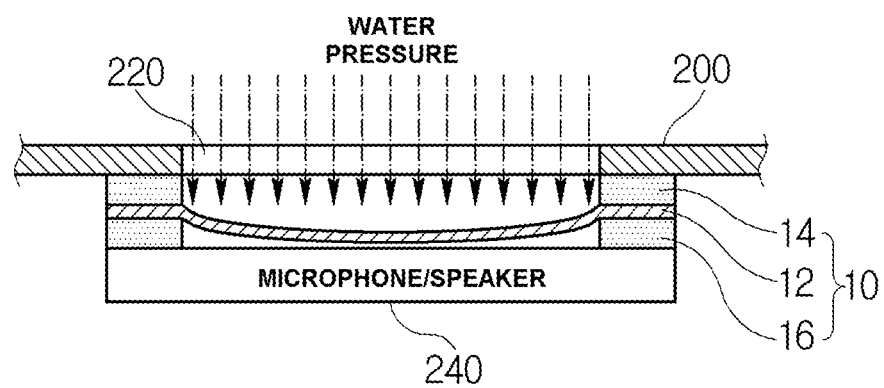
[FIG. 8]
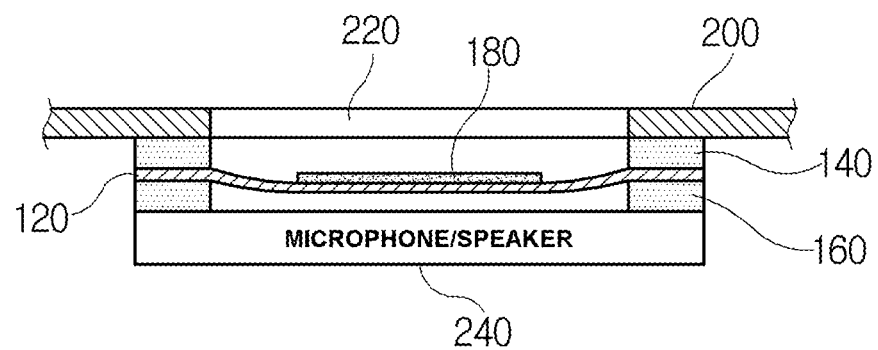

WATERPROOF SOUND-TRANSMITTING SHEET

CROSS-REFERENCE TO RELATED APPLICATIONS

This application is a National Stage of International patent application PCT/KR2017/006990, filed on Jun. 30, 2017, which claims priority to foreign Korean patent application No. 10-2016-0086225 filed on Jul. 7, 2016, the disclosures of which are incorporated by reference in their entirety.

FIELD OF THE INVENTION

The present disclosure relates to a waterproof sound-transmitting sheet, and more particularly, to a waterproof sound-transmitting sheet for increasing sound transmission efficiency and enhancing waterproof performance.

BACKGROUND

In recent years, mobile electronic appliances, such as a portable terminal, a digital camera, and a notebook, have increasingly been used. Such a mobile electronic appliance needs to have waterproof function because it is for portable. However, an acoustic hole for emitting sound is formed on a portion where a speaker, a microphone, etc. is installed, and water or dust permeates into the electronic appliance through the acoustic hole.

Accordingly, the acoustic hole is provided with a waterproof sound-transmitting sheet for passing through sound and blocking water or dust. Such a waterproof sound-transmitting sheet should be manufactured considering both waterproof performance and sound transmission efficiency.

Regarding the waterproof sound-transmitting sheet, Korean Patent Publication No. 10-2010-0041839 (Apr. 22, 2010) discloses a configuration that is composed of a porous polytetrafluoroethylene film.

However, there is a problem in that the conventional waterproof sound-transmitting film is composed of only a porous polytetrafluoroethylene film, such that it is stretched due to externally-applied impact or sound pressure as the use period becomes long.

At this time, there is a problem in that as the conventional waterproof sound-transmitting film is stretched by a pressure, the micropores of the porous film become larger to reduce waterproof performance, and when the pressure is maintained, a restoring force (elasticity) is reduced to reduce or lose acoustic performance.

In order to solve the problems, conventionally, a waterproof sound-transmitting sheet composed of a waterproof layer and a support layer was developed. At this time, since the waterproof performance at about 0.1 to 0.2 atm was required in the past, a waterproof sound-transmitting sheet, which has a structure that is formed of a porous material for sound-transmitting and stacks a waterproof layer and a protective layer to move by sound pressure, was developed.

Meanwhile, conventionally, the waterproof sound-transmitting sheet was applied to a portable terminal and required to have waterproof performance at about 0.1 to 0.2 atm, but as it is recently applied to a smart watch, waterproof performance at about 5 atm (about 50 m depth of water) that is a reference of a waterproof watch is required.

However, the waterproof layer is composed of a porous material, such that when a pressure of about 5 atm is applied thereto, the conventional waterproof sound-transmitting sheet has the protective layer stretched by the pressure applied thereto, thus increasing the stretch degree of the waterproof layer.

Accordingly, there is a problem in that in the conventional waterproof sound-transmitting sheet, the size of the micropores of the waterproof layer becomes larger, thus reducing waterproof performance.

In addition, the conventional waterproof sound-transmitting sheet is designed based on a pressure of about 0.1 to 0.2 atm, such that when a pressure of about 5 atm recently required is continuously applied thereto, the elasticity of the waterproof layer is lost, thus not restoring it in a state that has been stretched toward the protective layer.

Accordingly, there is a problem in that in the conventional waterproof sound-transmitting sheet, sound loss and noise are caused by the collision between the protective layer moved by a sound pressure of a speaker or a microphone and the stretched waterproof layer, thus reducing sound-transmitting performance.

In addition, there is a problem in that the conventional waterproof sound-transmitting sheet is adhered to a portable terminal through a thin film-like adhesive layer, such that when a pressure of about 5 atm is applied thereto, the adhesive layer is separated from the portable terminal as the waterproof layer is stretched, thus reducing waterproof performance.

SUMMARY OF THE INVENTION

The present disclosure is intended to solve the above problems, and an object of the present disclosure is to provide a waterproof sound-transmitting sheet, which forms a reinforcement member on the waterproof sound-transmitting layer to minimize the displacement amount while maintaining elasticity at a pressure of about 1 atm or more, thus maintaining waterproof performance and sound-transmitting performance.

For achieving the object of the present disclosure, a waterproof sound-transmitting sheet according to an embodiment of the present disclosure includes a waterproof sound-transmitting layer formed of a film having elasticity; a first adhesive layer adhered to one surface of the waterproof sound-transmitting layer; and a reinforcement member having stiffness higher than that of the waterproof sound-transmitting layer, and spaced apart from the first adhesive layer to be formed on the waterproof sound-transmitting layer.

The reinforcement member may be formed on at least one of one surface and the other surface of the waterproof sound-transmitting layer to improve the water pressure resistance characteristic of the waterproof sound-transmitting layer.

The thickness of the reinforcement member may be formed to be thinner than the thickness of the first adhesive layer, and the reinforcement member may have a ring shape.

The reinforcement member is not deformed when a pressure of 1 atm is applied thereto, and may be configured to contain at least one among polyethylene terephthalate (PET), polypropylene (PP), polyethylene (PE), and Nylon.

The reinforcement member may be formed by hardening some areas of the waterproof sound-transmitting layer.

Accordingly, the waterproof sound-transmitting layer may include a first area for acoustic transmission and a second area for reinforcing the strength of the waterproof sound-transmitting layer, and the first area may be disposed on the outer circumference of the second area.

The waterproof sound-transmitting layer may further include a third area for acoustic transmission, and the third area may be disposed on the inner circumference of the second area having a ring shape.

The waterproof sound-transmitting layer may further include a fourth area disposed on the outer circumference of the first area to be adhered to the first adhesive layer.

The first adhesive layer may be formed in a ring shape having a hole formed therein.

The waterproof sound-transmitting sheet according to an embodiment of the present disclosure may further include a second adhesive layer formed in a ring shape having a hole formed therein to be adhered to the other surface of the waterproof sound-transmitting layer.

According to the present disclosure, since the stretch-shrinkage performance of the waterproof sound-transmitting layer is fixed according to a material, it is possible for the waterproof sound-transmitting sheet to form the reinforcement member on the waterproof sound-transmitting layer, thus preventing deformation of the waterproof sound-transmitting layer by minimizing the displacement amount while maintaining the stretch-shrinkage performance of the waterproof sound-transmitting layer at a pressure of about 1 atm or more.

In addition, it is possible for the waterproof sound-transmitting sheet to form the reinforcement member on the waterproof sound-transmitting layer, thus minimizing a stress area and a stretch-shrinkage area due to a pressure.

In addition, it is possible for the waterproof sound-transmitting sheet to form the reinforcement member on the waterproof sound-transmitting layer, thus minimizing a reduction in a restoring force (elasticity) of the waterproof sound-transmitting layer by absorbing a pressure by the reinforcement member to reduce the displacement amount due to the pressure.

In addition, it is possible for the waterproof sound-transmitting sheet to form the reinforcement member to minimize a reduction in a restoring force (elasticity) of the waterproof sound-transmitting layer, thus performing stable sound transmission even after a high water pressure of about 5 atm is applied thereto for about 10 minutes to maintain sound-transmitting performance.

In addition, it is possible for the waterproof sound-transmitting sheet to form the reinforcement member on the waterproof sound-transmitting layer, thus stably performing sound transmission as compared to the conventional waterproof sound-transmitting sheet at the same sound pressure.

BRIEF DESCRIPTION OF THE DRAWINGS

FIGS. 1 and 2 are diagrams for explaining a waterproof sound-transmitting sheet according to an embodiment of the present disclosure.

FIGS. 3 to 6 are diagrams for explaining a reinforcement member of FIG. 1.

FIGS. 7 and 8 are diagrams for explaining a comparison between the conventional waterproof sound-transmitting sheet and the waterproof sound-transmitting sheet according to an embodiment of the present disclosure.

DETAILED DESCRIPTION

Hereinafter, the most preferred embodiment of the present disclosure will be described with reference to the accompanying drawings so that those skilled in the art to which the present disclosure pertains may easily practice the technical spirit of the present disclosure. First, in adding reference numerals to the components in each drawing, it is to be noted that the same components are denoted by the same reference numerals even though they are illustrated in different drawings. In addition, in the following description of the present disclosure, a detailed description of relevant known configurations or functions will be omitted when it is determined to obscure the subject matter of the present disclosure.

Referring to FIGS. 1 and 2, a waterproof sound-transmitting sheet 100 is configured to include a waterproof sound-transmitting layer 120 having elasticity (stretch-shrinkage performance), a first adhesive layer 140 adhered to the upper surface of the waterproof sound-transmitting layer 120, a second adhesive layer 160 adhered to the lower surface of the waterproof sound-transmitting layer 120, and a reinforcement member 180 formed on the waterproof sound-transmitting layer 120.

That is, the waterproof sound-transmitting sheet 100 has the first adhesive layer 140 and the second adhesive layer 160 adhered to the upper surface and the lower surface of the waterproof sound-transmitting layer 120 having the reinforcement member 180 formed on at least one surface thereof, respectively. At this time, the waterproof sound-transmitting sheet 100 may further include a support layer (not illustrated) and a third adhesive layer (not illustrated) interposed between the second adhesive layer 160 and a microphone or speaker module.

The waterproof sound-transmitting layer 120 is formed of a thin film in a predetermined shape. At this time, the waterproof sound-transmitting layer 120 is formed of a thin film in various shapes such as a circular shape, an elliptical shape, a square shape, and a hexagonal shape according to an acoustic hole, an internal coupling structure, etc. of an applicable device.

Generally, since the applicable device to which the waterproof sound-transmitting sheet 100 is applied has an acoustic hole in a very small circular shape, the waterproof sound-transmitting layer 120 is mainly formed in a circular shape or an elliptical shape.

In addition, the waterproof sound-transmitting layer 120 may be formed of a thin film having a thickness of about 5 μm to 100 μm according to sound-transmitting and waterproof performance required by the applicable device. At this time, the waterproof sound-transmitting layer 120 may also be formed in a thickness of 5 μm or less and 100 μm or more considering a thickness of the applicable device. Herein, the waterproof sound-transmitting layer 120 has the highest sound-transmitting performance at about 5 μm.

The waterproof sound-transmitting layer 120 is composed of a nonporous membrane formed through electrospinning in order to provide waterproof performance at a high water pressure. For example, the waterproof sound-transmitting layer 120 may be formed in a high elastic nonporous film shape by electrospinning a polymer material, forming a polymer material layer on a web, and then heat-treating the polymer material layer to melt the structure on the web.

Herein, the polymer material may use aromatic polyesters such as polyimide, polyimide, polyamideimide, poly (meta-phenylene isophthalamide), polysulfone, polyetherketone, polyetherimide, polyethylene terephthalate, polytrimethylene terephthalate, and polyethylene naphthalate, polyphosphazenes such as polytetrafluoroethylene, polydiphenoxaphosphazene, and poly {bis[2-(2-methoxyethoxy) phosphazene]}, polyurethane copolymers containing polyurethane and polyetherurethane, cellulose acetate, cellulose acetate butyrate, cellulose acetate propionate, etc. In addition, it may use polyvinylidene fluoride (PVDF), poly (vinylidene fluoride-co-hexafluoropropylene), perfluoropolymers, polyvinyl chloride or polyvinylidene chloride, and copolymers thereof, and polyethyleneglycol derivatives containing polyethyleneglycol dialkyl ether and polyethyleneglycol dialkyl ester, polyoxides containing poly (oxymethylene-oligo-oxyethylene), polyethylene oxide, and polypropylene oxide, polyacrylonitrile copolymers containing polyvinyl acetate, poly (vinylpyrrolidone-vinyl acetate), polystyrene and polystyrene acrylonitrile copolymers, polyacrylonitrile, polyacrylonitrile methyl methacrylate copolymers, poly methyl methacrylate, polymethyl methacrylate copolymer and a mixture thereof.

The waterproof sound-transmitting layer 120 is formed by electrospinning so that the thickness thereof is easily adjusted. Particularly, the thickness of the waterproof sound-transmitting layer 120 is formed by using an electrospinning process easily and thinly, thus forming the waterproof sound-transmitting sheet 100 having entire excellent sound-transmitting performance. The porous type waterproof sound-transmitting sheet 100 is relatively less sensitive to the thickness of the sheet because it transmits sound through the pores. On the contrary, the nonporous type waterproof sound-transmitting sheet 100 is required to have a thin thickness of the sheet so that sound vibration on one surface thereof may be transmitted to the other surface thereof more effectively.

In addition, since the waterproof sound-transmitting layer 120 is formed in a nonporous type, it is possible to implement waterproof performance higher than that of the waterproof sound-transmitting sheet 100 including the pore type waterproof sound-transmitting layer 120.

The waterproof sound-transmitting layer 120 may also be composed of a high elasticity (high stretch-shrinkage property) and nonporous film manufactured by a method other than electrospinning in order to provide waterproof performance at a high water pressure. For example, the waterproof sound-transmitting layer 120 may be composed of a high elastic material such as latex, polyurethane (PU), or Thermoplastic Poly Urethane (TPU), and may be formed in the nonporous film shape in order to maintain waterproof performance at a pressure of about 1 atm or more.

At this time, the waterproof sound-transmitting layer 120 may provide waterproof performance at a pressure of about 0.1 to 0.2 atm when a large number of pores are formed in a high elastic material, but when a pressure of about 1 atm or more is applied thereto, the pores may become larger by a water pressure, thus reducing waterproof performance.

Therefore, in order to provide waterproof performance at a pressure of about 5 atm or more, the waterproof sound-transmitting layer 120 is preferably composed of a nonporous film. At this time, the waterproof sound-transmitting layer 120 is not limited only to the nonporous film, but may also be formed of a porous material in some cases.

The first adhesive layer 140 is formed of a thin film in a predetermined shape having a hole 142 therein. The first adhesive layer 140 has the upper surface adhered to the acoustic hole formed in the applicable device, and has the lower surface adhered to the upper surface of the waterproof sound-transmitting layer 120.

The first adhesive layer 140 may be formed of a thin film in various shapes such as a circular shape, an elliptical shape, a square shape, and a hexagonal shape according to the shape of the waterproof sound-transmitting layer 120. At this time, the first adhesive layer 140 has the hole 142 for sound-transmitting formed therein.

The second adhesive layer 160 is formed of a thin film having a predetermined thickness for securing a spacing distance between the waterproof sound-transmitting layer 120 and a microphone or speaker module of the applicable device. The second adhesive layer 160 has the upper surface adhered to the lower surface of the waterproof sound-transmitting layer 120, and has the lower surface adhered to the microphone or speaker module of the applicable device.

At this time, the second adhesive layer 160 may also be formed of a material having elasticity such as sponge or foam. In this case, the second adhesive layer 160 is mounted between the waterproof sound-transmitting layer 120 and the microphone or speaker module to serve as a sealing material.

The second adhesive layer 160 may be formed of a thin film in various shapes such as a circular shape, an elliptical shape, a square shape, and a hexagonal shape according to the shape of the waterproof sound-transmitting layer 120. At this time, the second adhesive layer 160 has the hole 162 for sound-transmitting formed therein.

The reinforcement member 180 is formed on the waterproof sound-transmitting layer 120 to minimize an area stretched and shrinked by a water pressure (hereinafter referred to as a stretch-shrinkage area). At this time, the reinforcement member 180 minimizes the stretch-shrinkage area of the waterproof sound-transmitting layer 120 within a range that satisfies the required sound-transmitting performance. For this purpose, the reinforcement member 180 is spaced apart from the first adhesive layer 140 to be formed on the waterproof sound-transmitting layer 120.

The reinforcement member 180 may be formed of a thin film in various shapes such as a circular shape, an elliptical shape, a square shape, and a hexagonal shape. At this time, as illustrated in FIG. 3, the reinforcement member 180 may have a hole 182 for sound-transmitting formed therein to be formed in a ring shape as well.

The reinforcement member 180 is formed of a hardening material having stiffness higher than that of the waterproof sound-transmitting layer 120 to be formed on at least one of the upper surface and the lower surface of the waterproof sound-transmitting layer 120. That is, the reinforcement member 180 is formed of a hardening material having stiffness not varying even at a pressure of about 5 atm such as a film containing at least one among polyethylene terephthalate (PET), polypropylene (PP), polyethylene (PE), and Nylon to be bonded to at least one of the upper surface and the lower surface of the waterproof sound-transmitting layer 120.

At this time, as illustrated in FIG. 4, in the case that the reinforcement member 180 is formed only on the lower surface of the waterproof sound-transmitting layer 120, the outer circumference of one surface bonded to the waterproof sound-transmitting layer 120 may be separated when the waterproof sound-transmitting layer 120 is stretched downwards (i.e., toward the speaker or microphone module) by a water pressure.

Therefore, it is preferable that the reinforcement member 180 is formed only on the upper surface thereof, or is formed on both the upper surface thereof and the lower surface thereof in order to improve the water pressure resistance characteristic (see FIG. 5).

The reinforcement member 180 is formed to have a thickness thinner than that of the first adhesive layer 140 or the second adhesive layer 160 according to the position to be formed. That is, the reinforcement member 180 is formed to have a thickness thinner than that of the first adhesive layer 140 when it is formed on the upper surface of the waterproof sound-transmitting layer 120, and is formed to have a thickness thinner than that of the second adhesive layer 160 when it is formed on the lower surface of the waterproof sound-transmitting layer 120.

At this time, when the reinforcement member 180 is formed to have a thickness equal to or greater than that of the first adhesive layer 140 or the second adhesive layer 160, sound-transmitting performance is reduced by interference. That is, the reinforcement member 180 closely contacts with a housing of the applicable device 200, or closely contacts with the microphone or speaker module to reduce the vibration displacement of the waterproof sound-transmitting layer 120 upon sound transmission, thus reducing sound-transmitting performance.

Meanwhile, the reinforcement member 180 may also be formed by hardening a part of the waterproof sound-transmitting layer 120. That is, as illustrated in FIG. 6, it is possible to remove the stretch-shrinkage performance of the corresponding area by hardening some areas of the waterproof sound-transmitting layer 120, thus forming the reinforcement member 180 having stiffness higher than that of the waterproof sound-transmitting layer 120.

For example, by applying heat to only the area where the reinforcement member 180 is to be formed in the waterproof sound-transmitting layer 120 to melt it, it is possible to remove the stretch-shrinkage performance of the corresponding area to form the reinforcement member 180 having stiffness higher than that of the waterproof sound-transmitting layer 120.

For another example, by setting an area where the reinforcement member 180 is to be formed in the waterproof sound-transmitting layer 120 and then injecting or impregnating a hardening agent (e.g., an adhesive agent, a hardening liquid, etc.), it is also possible to harden the area where the reinforcement member 180 is to be formed to form the reinforcement member 180 having stiffness higher than that of the waterproof sound-transmitting layer 120.

As described above, as the reinforcement member 180 is formed, the waterproof sound-transmitting layer 120 may be divided into the first to fourth areas.

The first area is an area for acoustic transmission, and is interposed between the reinforcement member 180 and the adhesive layer (i.e., between the first adhesive layer 140 and the second adhesive layer 160). That is, the first area is interposed between the outer circumference of the second area and the inner circumference of the fourth area.

The second area is an area for reinforcing the strength of the waterproof sound-transmitting layer, and is a portion where the reinforcement member 180 is formed therein or is adhered thereto.

The third area is an area for acoustic transmission, and is disposed on the inner circumference of the reinforcement member 180 formed in a ring shape.

The fourth area is an area where the waterproof sound-transmitting layer 120 and the applicable device 200 are adhered to each other, and is disposed on the outer circumference of the first area to be adhered to the first adhesive layer 140. At this time, the fourth area is disposed on the outer circumference of the first area.

Referring to FIG. 7, a conventional waterproof sound-transmitting sheet 10 is bonded to an acoustic hole 220 of the applicable device 200 through a first adhesive layer 14, and is bonded to a microphone or speaker module 240 embedded in the applicable device 200 through a second adhesive layer 16.

At this time, in the conventional waterproof sound-transmitting sheet 10, when a water pressure is applied thereto, a stress area and a stretch-shrinkage area due to a water pressure are formed in the entire area of the waterproof sound-transmitting layer 12.

Accordingly, the conventional waterproof sound-transmitting sheet 10 is kept in a stretched state as a restoring force (elasticity) of the waterproof sound-transmitting layer 12 is reduced, thus reducing sound-transmitting performance. That is, in the conventional waterproof sound-transmitting sheet 10, when the waterproof sound-transmitting layer 12 is kept in a stretched state, vibration due to a sound pressure is not transmitted and thereby sound transmission is not performed or sound transmission efficiency is reduced, thus reducing sound-transmitting performance.

On the contrary, referring to FIG. 8, the waterproof sound-transmitting sheet 100 according to an embodiment of the present disclosure is bonded to the acoustic hole 220 of the applicable device 200 through the first adhesive layer 140, and is bonded to the microphone or speaker module 240 embedded in the applicable device 200 through the second adhesive layer 160, and the reinforcement member 180 is formed on the waterproof sound-transmitting layer 120.

As a result of the experiment, the vibration displacement required for sound transmission is considerably small, such that the sound transmission is possible even when the area of the waterproof sound-transmitting sheet 100 is narrowed to reduce the vibration displacement.

However, when the area of the waterproof sound-transmitting sheet 100 is narrowed, it becomes difficult to install it in the microphone or speaker module having a relatively wide area.

Therefore, the waterproof sound-transmitting sheet 100 according to an embodiment of the present disclosure forms the reinforcement member 180 on the waterproof sound-transmitting layer 120, thus minimizing the displacement of the waterproof sound-transmitting layer 120 at a high water pressure (atmospheric pressure).

Accordingly, the waterproof sound-transmitting sheet 100 according to an embodiment of the present disclosure may form the reinforcement member on the waterproof sound-transmitting layer 120 having a predetermined stretch-shrinkage performance according to a material, thus preventing deformation of the waterproof sound-transmitting layer by minimizing the displacement amount while maintaining the stretch-shrinkage performance of the waterproof sound-transmitting layer at a pressure of about 1 atm or more.

In addition, the waterproof sound-transmitting sheet 100 according to an embodiment of the present disclosure may cause the displacement due to a water pressure (or atmospheric pressure) to occur only in an area where the reinforcement member 180 is not formed in the entire area of the waterproof sound-transmitting layer 120, thus minimizing the stress area due to the water pressure, and minimizing the stretch-shrinkage area.

Accordingly, the waterproof sound-transmitting sheet 100 according to an embodiment of the present disclosure may prevent the waterproof sound-transmitting layer 120 from colliding with the microphone or speaker module 240, and may prevent the loss of stretch-shrinkage performance of the waterproof sound-transmitting layer 120, thus maintaining waterproof and sound-transmitting performance even at a high water pressure.

In addition, the waterproof sound-transmitting sheet 100 according to an embodiment of the present disclosure may form the reinforcement member 180 on the waterproof sound-transmitting layer 120, thus stably performing sound transmission as compared to the conventional waterproof sound-transmitting sheet at the same sound pressure.

As described above, although preferred embodiments according to the present disclosure have been described, it is to be understood that they may be modified into various forms, and various modifications and changes thereof may be embodied by those skilled in the art without departing from the scope of the present disclosure.

The invention claimed is:

1. A waterproof sound-transmitting sheet, comprising:
a waterproof sound-transmitting layer formed of a non-porous film having elasticity;
a first adhesive layer having a hole therein and adhered to one surface of the waterproof sound-transmitting layer; and
a reinforcement member having stiffness higher than that of the waterproof sound-transmitting layer,
wherein the reinforcement member is disposed inside the hole of the first adhesive layer, formed on the one surface of the waterproof sound-transmitting layer, and spaced apart from the first adhesive layer inside the hole to suppress the stretchiness of the waterproof sound-transmitting layer when a water pressure is applied,
wherein the reinforcement member is a ring shape having a hole therein, and
wherein an outer circumference of the reinforcement member is disposed on the one surface of the waterproof sound-transmitting layer and spaced apart from the first adhesive layer.

2. The waterproof sound-transmitting sheet of claim 1, wherein the reinforcement member is formed on at least one of one surface and the other surface of the waterproof sound-transmitting layer to improve the water pressure resistance characteristic of the waterproof sound-transmitting layer.

3. The waterproof sound-transmitting sheet of claim 1, wherein the thickness of the reinforcement member is formed to be thinner than the thickness of the first adhesive layer.

4. The waterproof sound-transmitting sheet of claim 1, wherein the reinforcement member is not deformed when a pressure of 1 atm is applied thereto.

5. The waterproof sound-transmitting sheet of claim 1, wherein the reinforcement member is configured to contain at least one among polyethylene terephthalate, polypropylene, polyethylene, and Nylon.

6. The waterproof sound-transmitting sheet of claim 1, wherein the reinforcement member is formed by hardening some areas of the waterproof sound-transmitting layer.

7. The waterproof sound-transmitting sheet of claim 1, wherein the waterproof sound-transmitting layer comprises
a first area for acoustic transmission; and
a second area for reinforcing the strength of the waterproof sound-transmitting layer, and
wherein the first area is disposed on the outer circumference of the second area.

8. The waterproof sound-transmitting sheet of claim 7, wherein the waterproof sound-transmitting layer further comprises a third area for acoustic transmission, and
wherein the third area is disposed on the inner circumference of the second area having a ring shape.

9. The waterproof sound-transmitting sheet of claim 7, wherein the waterproof sound-transmitting layer further comprises a fourth area disposed on the outer circumference of the first area to be adhered to the first adhesive layer.

10. The waterproof sound-transmitting sheet of claim 1, wherein the first adhesive layer is formed in a ring shape.

11. The waterproof sound-transmitting sheet of claim 1, further comprising a second adhesive layer formed in a ring shape having a hole formed therein to be adhered to the other surface of the waterproof sound-transmitting layer.

* * * * *